United States Patent [19]

Prinz et al.

[11] Patent Number: 4,554,834
[45] Date of Patent: Nov. 26, 1985

[54] ACOUSTIC SENSOR AND METHOD OF USING SAME FOR DETERMINING THE POSITION OF A TOOL RELATIVE TO A WORKPIECE

[75] Inventors: Friedrich B. Prinz; James F. Hoburg; Kristjan Gunnarsson, all of Pittsburgh, Pa.

[73] Assignee: Carnegie-Mellon University, Pittsburgh, Pa.

[21] Appl. No.: 546,519

[22] Filed: Oct. 28, 1983

[51] Int. Cl.⁴ ............................................. G01N 29/00
[52] U.S. Cl. ......................................... 73/597; 73/642; 73/644; 318/576; 318/652; 367/127
[58] Field of Search ................ 73/597, 602, 642, 644; 367/150, 127, 120; 318/576, 645, 652

[56] References Cited

U.S. PATENT DOCUMENTS

| | | | |
|---|---|---|---|
| 2,743,429 | 4/1956 | Erdman et al. | 367/127 |
| 4,326,155 | 4/1982 | Griebeler | 73/602 |
| 4,445,380 | 5/1984 | Kaminski | 73/642 |
| 4,459,526 | 7/1984 | Griebeler | 318/576 |

OTHER PUBLICATIONS

A paper by Elmer L. Griebeler titled "A Narrow-Beam Prove Using Shock Waves", presented May 12, 1983.

Primary Examiner—Howard A. Birmiel
Attorney, Agent, or Firm—Buell, Ziesenheim, Beck & Alstadt

[57] ABSTRACT

An acoustic sensor and method of using same for determining the position of a tool from a workpiece are disclosed in which a piezoelectric transducer having a curved surface emits a sound wave which strikes the workpiece and is reflected back to the sensor. The sensor and tool are positioned relative to one another so that the workpiece will be near the focal point of the curved surface when the tool is operating. This positioning substantially overcomes the attenuation problems of high frequency sound waves transmitted through air.

8 Claims, 5 Drawing Figures

ACOUSTIC SENSOR AND METHOD OF USING SAME FOR DETERMINING THE POSITION OF A TOOL RELATIVE TO A WORKPIECE FIELD OF INVENTION

The invention relates to devices and techniques for determining the position of a tool relative to a workpiece without touching the workpiece. The invention is particularly useful for controlled guidance and positioning of industrial robots.

DESCRIPTION OF THE PRIOR ART

Robots have been developed and used in manufacturing operations involving workpieces having gaps or discontinuities between or within them. In many operations such as arc welding it is necessary to position and guide a robot manipulator relative to these gaps or discontinuities. For example, the electrode of an arc welding robot must follow the gap between the pieces being welded together A large-scale implementation of robotic units in production systems is limited by at least two major factors. First, the positioning accuracy of commercially available robots is not sufficient for a significant number of manufacturing applications. Although the repeatability of most robots today is of the order of 0.050 inch over the working envelope, the absolute positioning accuracy is sometimes off as much as 0.250 to 0.500 inch. Second, even if we had perfectly accurate robots the environment in which they operate is usually not perfect. Furthermore, in most situations it is economically not feasible to put robots into a high structured environment in which the positions and dimensions of each part are accurately known.

There is general agreement between robot manufacturers and robot users that sensory feedback systems must be developed which account for inaccuracies of the robot and its surroundings. Vision systems are generally regarded as the most important non-contact sensors. Their disadvantages result from high cost and the fact that digital image processing times are too great to obtain spatial information (e.g., the distance between the vision camera and object being looked at) within short periods of time, Say one millisecond. Vision cameras, obviously deliver only two dimensional intensity patterns. Distances normal to the plane of the camera can be obtained only if structured light sources are used or if the dimensions of the object are known. Another group of sensors encompasses a variety of force and torque measuring devices. They are called contact or tactile sensors. Practically all of these systems are based on the measurement of small displacements of well characterized elastic media. Knowing the stiffness of the material, one can readily convert the displacements into forces and torques. Naturally the operating regime of such sensors is quite limited since they function only within the elastic limits of the material in use.

One way of obtaining information on both relative and absolute distances between sensor and object in real time is to use acoustic waves. The most widely used technique for making sonic measurements in liquids and solids is the pulse method, introduced by Pellam and Galt in 1946. A pulse of sinusoidal voltage is applied to a piezoelectric transducer that is in contact with the sample. The transducer converts the electric pulse into an acoustical pulse that is transmitted into the medium. Typically the voltage amplitude is between a few volts and a few hundred volts. The pulse width may vary between a few nanoseconds and 10 microseconds The resulting acoustic frequency is in the ultrasonic regime, usually between 100 kHz and several MHz. The repetition rate of the pulse depends on the distance between the object and the transducer but is generally of the order of 100 Hz and 1000 Hz.

In the single transducer pulse technique the acoustic pulse is reflected back to the transducer which serves then as the receiver. The time delay until the echo from the object rrives at the transducer can be readily converted into a istance. This is done by multiplying the time delay by the speed of sound in the medium between the transducer and the object. The pulse technique has been successfully used for the detection of internal flaws in metals (NDT, non-destructive testing method) as well as for measuring the thickness of solids. In NDT applications the transducer is placed on the surface of the object being examined. The sound waves are transmitted directly into the solid.

The main difficulty in using sonar systems for robotic pplications results from the fact that high frequency sound aves must be transmitted through air. The extinction distance $d_e = 1/\sigma$ for $CO_2$ free air at 20° C. is 730 m, 7.3 m and 7.3 cm at 10, 100 and 1000 kHz respectively. $d_e$ is the distance at which the amplitude of a plane wave has fallen by a factor $1/e$, and $\sigma$ is the absorption coefficient. Acoustic sensors interfaced with ndustrial robots would have to operate above the 100 kHz level in order to eliminate interference with the noise from its environment. If acoustic sensors are to be used for seam tacking in arc welding, frequencies as high as 1 MHz may be required for The transmittance of a relatively noise free signal.

SUMMARY OF THE INVENTION

We have discovered that the problems associated with the attenuation of high frequency sound waves can be overcome to a significant degree by using transducers having a curved surface with a given focal point and positioning the transducer so that the workpiece is near the focal point of the transducer. With this technique we are able to detect narrow grooves that would not be distinguished by a non-focused beam. A sound wave emitted from the transducer is directed toward the workpiece and reflected back to the transducer. The time period between emission and return of the sound wave is measured and converted into distance. By scanning the workpiece with the transducer and recording the distances measured during each scan we can map the surface of the workpiece. This enables us to identify the gap which is to be welded. The robot can be programed to use that information to follow the gap with its welding tip.

Similar acoustic techniques have been used in underwater operations but prior to our invention the technique has been considered unsuitable for use in the atmosphere. The problem was that air tends to attenuate sound waves. Consequently, the reflected sound wave which has traveled through the air became so attenuated by the time it returned to the sensor as to be useless.

We have found that the problems associated with the attention of sound waves by the atmosphere can be substantially overcome by using transducers with curved surfaces and positionng the transducer so that the workpiece will be near the focal point of that curved surface. As the workpiece is moved away from that focal point distortion increases. When the workpiece is more than six inches from the focal point the reflected waves will be useless.

We prefer to shield the transducer from outside interference caused by sound or radio waves generated by nearby equipment.

We also prefer to apply to the transducer a voltage in the range of 600 volts to create sound waves at a pulsed frequency of about 150 Hz.

We further prefer to provide a curved surface on the transducer having a focal length from two to six inches.

In a second preferred embodiment we provide an array of transducers. One transducer may emit the signal while the others act only as receivers. Alternatively, all transducers could emit pulses sequentially and all would be receivers.

Other details, objects and advantages of the invention will become apparent as the following description of a present preferred embodiment thereof and a present preferred method of practicing the same proceeds.

BRIEF DESCRIPTION OF THE DRAWINGS

In the accompanying drawings we have shown a present preferred embodiment of the invention and have illustrated a present preferred method of practicing the same in which.

DESCRIPTION OF THE PREFERRED EMBODIMENT

Figure 1:
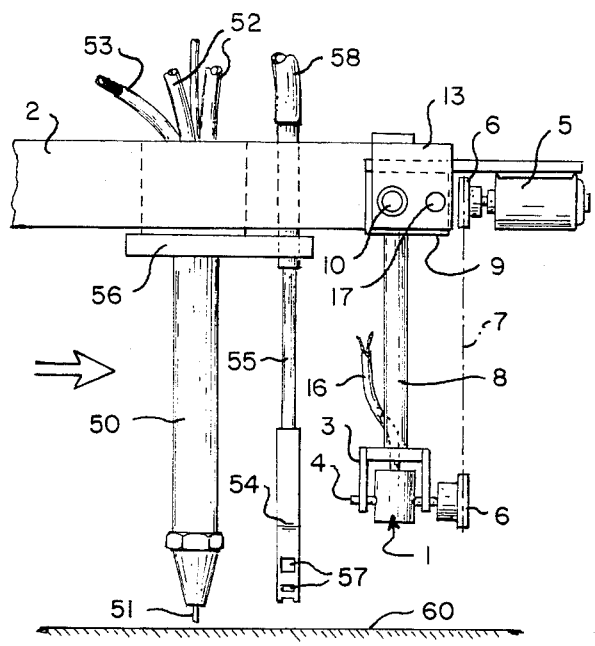
FIG. 1 is a side view of a first preferred embodiment of our sensor attached to a a robot arm.
Figure 2:
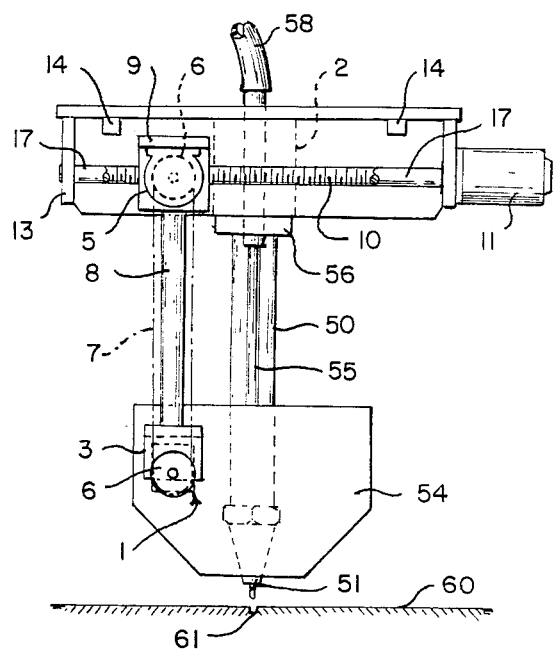
FIG. 2 is an end view of the embodiment of FIG. 1.

Referring to FIGS. 1 and 2 our sensor 1 is mounted on a robot arm 2 by a manipulator assembly which permits two degrees of freedom. The sensor 1 is pivotably attached to a lower frame 3 by rod 4. Motor 5 is connected through pulleys 6 and cord 7 to rod 4. Thus, motor 5 will turn rod 4 to rotate the sensor 1. The lower frame 3 is suspended on vertical support 8. Support 8 is attached to traveler 9 on threaded shaft 10. Threaded shaft 10 is held by upper frame 13 attached to the robot arm 2. Motor 11 drives shaft 10 causing the traveler to move back and forth along shaft 10. Adjustable microswitches 14 are attached to frame 13 for switching the rotation of the motor 11 and shaft 10. A guide rod 17 is also attached to frame 13 for guiding the traveler 9. One could also provide a rack and pinion arrangement to propel the traveler. An electrical cord 16 extends from the sensor 1 to a voltage source and voltage sensor (not shown). Also mounted to the robot arm 2 is a welding torch 50 for arc welding. The tip 51 of the electrode is adjacent to a workpiece 60 which is being welded. Supply lines 52 and 53 provide cooling water and inert gas to the electrode. We also prefer to provide a shield 54 suspended on support 55 between the sensor 1 and the welding tip 51. The shield 54 and electrode 50 are attached to the robot arm through frame 56. We further prefer to provide orifices 57 in the shield 54 to blow air away from the welding tip 51 and the sensor 1. The air is supplied by air hose 58 and passes through support 55 to the shield 54.

Figure 3:
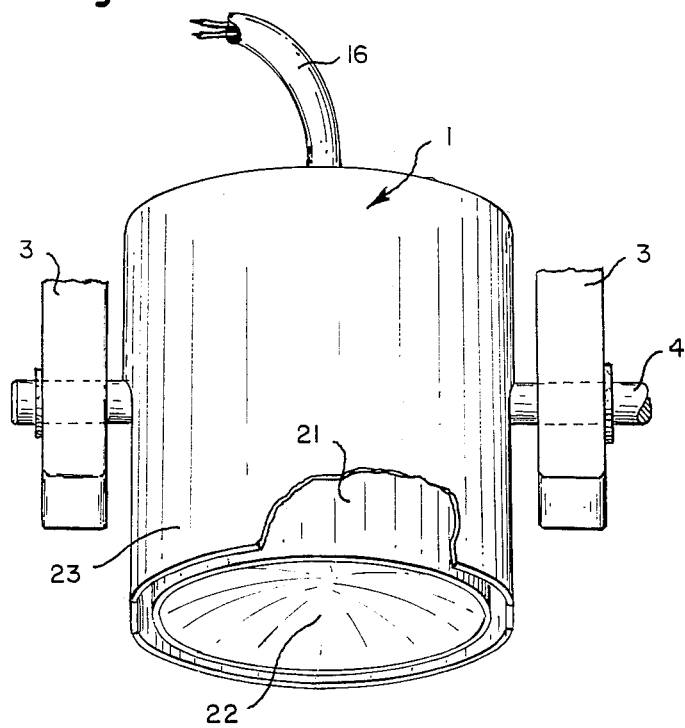
FIG. 3 is a perspective view of our sensor.

Turning to FIG. 3 the sensor 1 is comprised of a cylindrical piezoelectric transducer 21 having a curved bottom 22 and power cord 16 extending from its top. A larger open ended cylindrical shield 23 is suspended over the transducer 21 to prevent external sound waves and radio signals from striking the transducer 21. In most work environments other operating equipment will generate noise and radio signals. If such waves were permitted to strike the transducer they would cause voltages to be generated within the transducer that would interfere with our usage of the sensor. We have found that a shield made of $\mu$-metal will prevent such interference.

Figure 4:
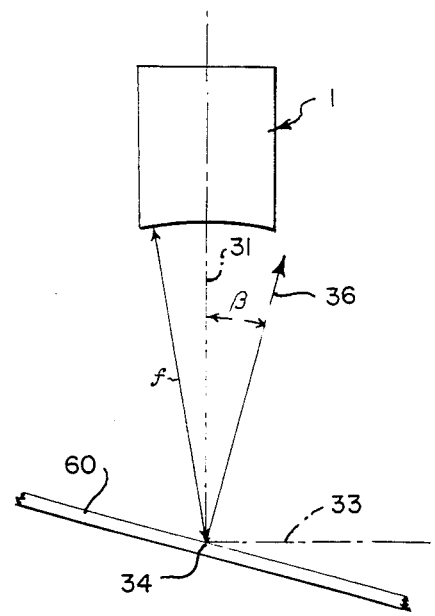
FIG. 4 is a diagram illustrating the operation of our transducer.

The operation of our sensor can best be understood by referring to FIGS. 1, 2 and 4. A sound wave 30 is emitted from the transducer which strikes the workpiece 60 and is reflected back toward the transducer. The time period h=tween emission of sound wave 30 and its return to the sensor is measured. From that measurement one can then calculate the distance between the sensor 1 and the workpiece 60. That distance will be greater when the sensor is over gap 61. We prefer that sound waves be generated in pulses over a chosen interval of time preferably between a few nanoseconds and 10 microseconds. We also prefer to use a 1 MHz sound wave which we have found to perform well over distances of 0.1 mm. to 40 mm. between the workpiece and the transducer. These high frequency sound waves are imperceptible to the human ear and outside the range of those sound waves generated by industrial equipment.

The angle of the workpiece 60 relative to the sensor 1 is also important. To illustrate this point we show in FIG. 4 a workpiece 60 placed at an angle relative to the sensor. Chain line 31 is perpendicular to the sensor and at a right angle to chain line 33. The top surface of the workpiece 60 passes through the focal point 34 of the transducer's curved surface at a focal distance f from the transducer. When a sound wave is emitted from the transducer it will strike the workpiece 60 and be reflected. We have found that if the angle $\beta$ between line 31 and normal 36 exceeds 5° the transducer will not sense the reflected wave. This occurs because the energy which is reflected back to the transducer is insufficient to generate a signal. Therefore, we attach our sensor so that it can be adjusted. If the robot arm cannot be placed substantially parallel to the workpiece the sensor 1 can be pivoted on rod 4 to chieve a substantially parallel alignment.

To assure that the workpiece is near the focal point we choose a curved surface having a given focal length. Then we position the sensor as shown in FIG. 1 so that the tip 51 of the tool 50 will be in the same plane as the focal point. We pefer to use curved surfaces having a focal length between 2 and 6 inches.

The manipulator assembly permits us to map the surface of the workpiece. As shaft 10 is turned the sensor transverses along an axis parallel to shaft 10. As it moves it takes several readings which are recorded in a memory unit and used by a computer to direct the robot arm along the seam of the workpiece 60. We have found that 200 signals per scan will provide sufficient data to map a seam between two flat surfaces. The arrow in FIG. 1 shows the direction in which the robot arm 2 moves relative to the workpiece 60. We prefer that the sensor move perpendicular to the direction in which the robot arm moves. However, we have found that the sensor will work if it travels in an arc which crosses the line of travel of the robot arm. Of course, if one wished to measure only the distance from the workpiece no scanning is needed and the sensor would remain in one position on shaft 10.

Figure 5:
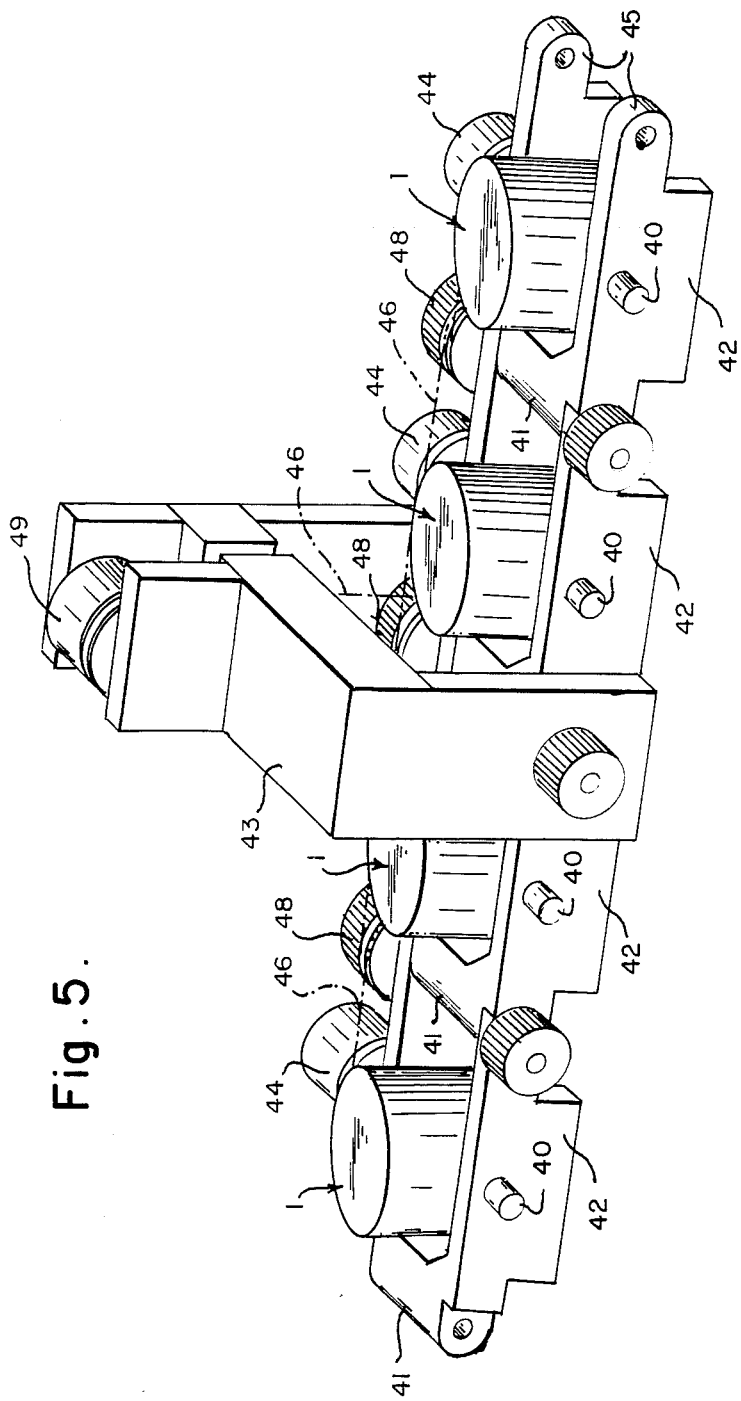
FIG 5 is an elevational view of a second preferred embodiment of our sensor having a plurality of transducers.

Our transducers could also be arranged in an array as shown in FIG. 5 to enable a greater surface area to be scanned. The sensors 1 are mounted on rods 40 rotatably attached to frames 42. The array of FIG. 5 is now composed of four units (each having a sensor 1, a frame 42 and pulley 44) connected by rods thru tongue 41 and clevis ends 45. This array is attached to bracket 43 which can be attached to a manipulator assembly or robot arm (both not shown). A pulley 44 is provided on each rod 40. A cord 46 runs from the pulleys to spools 48 and motor 49. Through this arrangement the transducers may be rotated together. Clearly, other drive mechanisms could be used in place of the pulley system. If desired one can couple this array to other similar arrays by inserting tongue 41 into the cleviced end 45 of a comparable frame 42.

We can operate the array in at least two ways. The transducers could be activated in series to produce pulses at separate times. Or, one transducer could emit a signal with the other transducers serving only as receivers. Each transducer would receive the signal or absence of signal reflected from the workpiece. That information could be transmitted to a computer and used to map the surface of the workpiece.

Those skilled in the art will recognize how a computer can be programed to handle the signals produced by our sensor to direct a robot. Therefore, there is no need to discuss such data processing here.

While we have shown and described certain present preferred embodiments of the invention and have illustrated a present preferred method of practicing the same, it is to be distinctly understood that the invention is not limited thereto, but may be variously embodied within the scope of the following claims.

We claim:

1. A method for sensing the position of a tool relative to a workpiece comprising the steps of:
    (a) placing a piezoelectric transducer having a curved surface with a single focal point above the workpiece so that the workpiece will be not more than six inches from the focal point of the curved surface;
    (b) moving the transducer relative to the workpiece;
    (c) applying a voltage to the transducer in a manner so as to cause the transducer to emit sound waves toward the workpiece while the transducer is at different positions relative to the workpiece;
    (d) allowing each sound wave to be reflected back from the workpiece to the transducer and to strike the transducer at some time period after the sound wave was emitted;
    (e) measuring the time period between emission of each sound wave and the striking of the transducer by that sound wave, and
    (f) converting each measured time period into a distance thereby obtaining a surface profile of the workpiece.

2. The method of claim 1 also comprising the step of shielding the transducer from outside interference.

3. The method of claim 1 wherein the voltage is applied in pulses.

4. The method of claim 3 wherein the pulse is repeated at regular time intervals in the range of one nanosecond to ten microseconds.

5. The method of claim 1 wherein the focal point is 2 to 6 inches from the curved surface.

6. A method for sensing the position of a tool relative to a workpiece comprising the steps of:
    (a) placing a plurality of piezoelectric transducers each having a curved surface with a single focal point above the workpiece so that the workpiece will be not more than six inches from the focal point of the curved surfaces of the transducers;
    (b) moving the transducers relative to the workpice;
    (c) applying a voltage to at least one transducer in a manner so as to cause the transducer to emit sound waves toward the workpiece while the transducer is at different positions relative to the workpiece;
    (d) allowing each sound wave to be reflected back from the workpiece to at least one transducer and to strike the transducer at some time period after the sound wave was emitted;
    (e) measuring the time period between emission of each sound wave and the striking of the transducer by that sound wave; and
    (f) converting each measured time period into a distance thereby obtaining a surface profile of the workpiece.

7. The method of claim 6 also comprising the step of shielding the transducer from outside interference.

8. The method of claim 6 wherein a voltage is applied to the transducers in a matter so as to cause the transducers to emit signals sequentially.

* * * * *

UNITED STATES PATENT AND TRADEMARK OFFICE
CERTIFICATE OF CORRECTION

PATENT NO. : 4,554,834

DATED : November 26, 1985

INVENTOR(S) : FREIDRICH B. PRINZ, JAMES F. HOBURG, KRISTJAN GUNNARSSON

Page 1 of 2

It is certified that error appears in the above-identified patent and that said Letters Patent is hereby corrected as shown below:

The Title of the Invention should read:

ACOUSTIC SENSOR AND METHOD OF USING SAME FOR DETERMINING THE POSITION OF A TOOL RELATIVE TO A WORKPIECE

After the Title of the Invention, the heading --Field of Invention-- should follow.

Column 1, line 45, change "Say" to --say--.

Column 2, line 11, change "rrives" to --arrives--.

Column 2, line 12, change "istance" to --distance--.

Column 2, line 22, change "pplications" to --applications--.

Column 2, line 23, change "aves" to --waves--.

Column 2, line 28, change "ndustrial" to --industrial--.

Column 2, line 33, change "The" to --the--.

Column 2, line 65, change "positionng" to --positioning--.

Column 3, line 27, after the word to, delete "a".

Column 4, line 16, change "h=tween" to --between--.

Column 4, line 46, change "chieve" to --achieve--.

UNITED STATES PATENT AND TRADEMARK OFFICE
CERTIFICATE OF CORRECTION

PATENT NO. : 4,554,834
DATED : November 26, 1985
INVENTOR(S) : Freidrich B. Prinz et al.

It is certified that error appears in the above-identified patent and that said Letters Patent is hereby corrected as shown below:

Column 6, line 29, change "workpice" to -- workpiece --.

Signed and Sealed this

Twenty-ninth Day of April 1986

[SEAL]

Attest:

DONALD J. QUIGG

*Attesting Officer*     *Commissioner of Patents and Trademarks*